LOUIS S. ROBBINS.
Improvement in Process of Extracting Oily and Fatty Matter.
No. 4,578. Reissued Oct. 3, 1871.
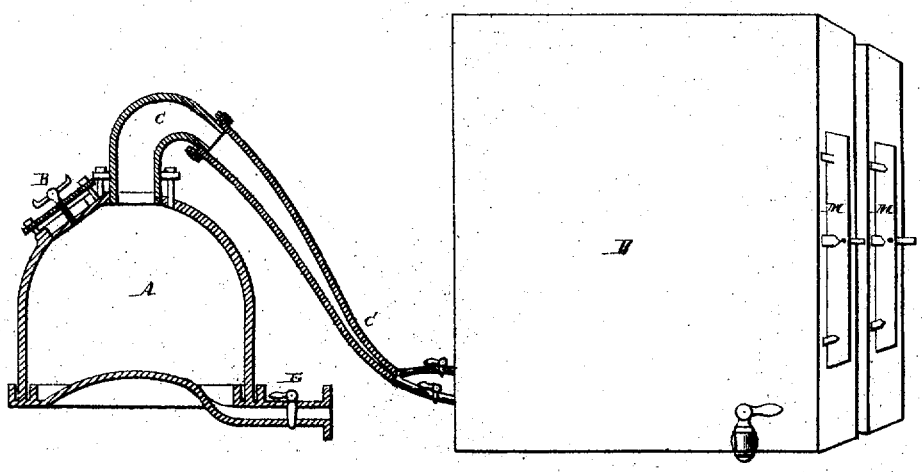
WITNESSES { Wm. A. Steel
John Parker
Louis S. Robbins
by his Attys
Howson and Son.

UNITED STATES PATENT OFFICE.

LOUIS S. ROBBINS, OF RYE, NEW YORK, ASSIGNOR TO ANN D. BREWTON.

IMPROVEMENT IN PROCESSES OF EXTRACTING OILY AND FATTY MATTERS.

Specification forming part of Letters Patent No. 75,980, dated March 24, 1868; reissue No. 4,578, dated October 3, 1871.

*To all whom it may concern:*

Be it known that I, LOUIS S. ROBBINS, of Rye, county of Westchester, State of New York, have invented a Process of Extracting Oily and Fatty Matters, of which the following is a specification:

My invention consists in extracting oily and fatty matters by the application of the vapors of hydrocarbon, substantially in the manner described hereafter.

I do not intend to limit myself to any particular form of apparatus, as there are various ways in which hydrocarbon in the condition of vapor may be employed in carrying my invention into effect.

The figure in the accompanying drawing represents one example of apparatus, in which A is a retort or still, made of any desirable form or size, in which petroleum or naphtha, or other equivalent hydrocarbon, is subjected to the action of heat in any suitable manner. B represents a manhole in the upper part of the retort, and is used in cleansing and charging the same. C is the vapor-pipe, communicating at one end with the retort A, at or near the top of the same, and also communicating with chambers or receptacles D. There are in the present instance two chambers, and the outer end of the pipe C is forked so as to communicate with both, and each branch of the said forked end of the pipe has a suitable cock for cutting off and regulating the supply of vapor. The chambers D are closed, with the exception of openings for admitting the material to be treated, and these openings are closed, after the introduction of said material to be treated, with doors M. At or near the lower end of each chamber is a suitable discharge-cock for drawing off the oily or fatty matter and such of the vapor as may be condensed in the chamber. The retort or still is also furnished with a discharge-pipe and cock, E, for drawing off the contents.

As an instance of the application of my invention, I may refer to the extracting of the animal oils or fats from wool. After the wool has been deposited in the chambers D and the doors M closed, the vapor from the retort is permitted to pass into the said chamber and permeates through the wool. The vapor being of a subtle and penetrating character, aided by its heat, acts as such a powerful solvent of the oily and fatty matter in the wool that the latter may be in a short time removed from the chamber, after cutting off the supply of vapor therefrom, and, by subsequent washing, may be reduced to a more perfect condition for manufacturing purposes than by other processes heretofore practiced. Simultaneously with the dissolving of the oily and gummy matter the alkaline substances contained therein are set free. The oily and fatty matters, together with the condensed vapors which accumulate at the bottom of the chamber, may be removed from time to time by opening the discharge-cock.

It will be evident that by the above process not only wool but other oil or fat-containing substances may be deprived of their oil or fat.

I wish it to be distinctly understood that I do not desire to claim, broadly, as my invention the employment of petroleum, benzole, and naphtha, or either of them, for the purpose of extracting oil from wool or other fibrous substances; nor do I claim the extraction of oils and fats by means of the solvent properties of volatile hydrocarbons in which the material to be treated is soaked or washed; my invention being restricted to the employment, as an oil and fat-extracting medium, of hydrocarbon vapor generated from liquid which is not itself in contact with the material to be treated, the said vapor, owing to its penetrating properties and diffusibility, being more efficient and economical than liquid hydrocarbons.

I claim—

The process, substantially as herein described, of extracting fatty and oily matters from substances in which such matters are contained by treating said substances with the light vapors obtained from the distillation of hydrocarbons, such as petroleum, naphtha, or other equivalent hydrocarbons.

In testimony whereof I have signed my name to this specification in the presence of two subscribing witnesses.

LOUIS S. ROBBINS.

Witnesses:

WM. A. STEEL,
H. HOWSON.